United States Patent
Ito et al.

(10) Patent No.: US 9,970,809 B2
(45) Date of Patent: May 15, 2018

(54) DIGITAL FILTER FOR DIGITAL WEIGHER, DIGITAL WEIGHER INCLUDING DIGITAL FILTER FOR DIGITAL WEIGHER AND WAVE FILTERING PROCESS METHOD

(75) Inventors: Sachie Ito, Akashi (JP); Takayuki Nagai, Kobe (JP); Ryo Shimizu, Akashi (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 1186 days.

(21) Appl. No.: 13/820,130

(22) PCT Filed: Sep. 8, 2010

(86) PCT No.: PCT/JP2010/005499
§ 371 (c)(1),
(2), (4) Date: May 13, 2013

(87) PCT Pub. No.: WO2012/032574
PCT Pub. Date: Mar. 15, 2012

(65) Prior Publication Data
US 2013/0226494 A1 Aug. 29, 2013

(51) Int. Cl.
*G01G 23/10* (2006.01)
*G01G 23/01* (2006.01)
(Continued)

(52) U.S. Cl.
CPC ............. *G01G 23/01* (2013.01); *G01G 3/142* (2013.01); *G01G 3/16* (2013.01); *G01G 23/10* (2013.01)

(58) Field of Classification Search
USPC .................................. 177/185; 702/101, 102
See application file for complete search history.

(56) References Cited

U.S. PATENT DOCUMENTS

| 5,062,492 A | 11/1991 | Inoue |
| 5,130,938 A | 7/1992 | Inoue |

(Continued)

FOREIGN PATENT DOCUMENTS

| JP | 2003-337062 A | 11/2003 |
| JP | 2006-078410 A | 3/2006 |

(Continued)

OTHER PUBLICATIONS

Extended European Search Report for EP 10 85 6927, dated Dec. 19, 2013.

(Continued)

*Primary Examiner* — Lam Nguyen
(74) *Attorney, Agent, or Firm* — Marshall, Gerstein & Borun LLP

(57) ABSTRACT

A digital filter for a digital weigher reduces a calculation time in an adapted filter while maintaining weighing accuracy, a digital weigher includes the filter for the weigher, and a wave filtering process method uses the digital filter for the digital weigher. A fixation section of a FIR filter removes an oscillating component in a predetermined frequency range, from a digital weighing signal. A determination device determines whether an amplitude of an oscillating component contained in a digital weighing signal derived by performing a wave filtering process falls within a predetermined damping range. A control device changes a frequency range of an oscillating component to be removed by an adaptive section of the filter based on a result of the determination. The adaptive section of the filter performs the wave filtering process with respect to the oscillating component in the frequency range changed by the control device.

10 Claims, 12 Drawing Sheets

(51) Int. Cl.
      *G01G 3/142*      (2006.01)
      *G01G 3/16*      (2006.01)

(56) References Cited

U.S. PATENT DOCUMENTS 7,739,068 B2 * 6/2010 Reber .................. G01G 3/1414
                                                                         177/185
2003/0215100 A1    11/2003    Kimura et al.

FOREIGN PATENT DOCUMENTS

| JP | 2008-182367 A | 8/2008 |
| JP | 2010-203972 A | 9/2010 |

OTHER PUBLICATIONS

Ikeda et al., "Dynamic Mass Measurement of Moving Vehicles," Transactions of the Society of Instrument and Control Engineers, vol. 28, No. 1, pp. 50-58, 1992.
International Search Report for PCT/JP2010/005499, dated Oct. 12, 2010.

* cited by examiner

DIGITAL FILTER FOR DIGITAL WEIGHER, DIGITAL WEIGHER INCLUDING DIGITAL FILTER FOR DIGITAL WEIGHER AND WAVE FILTERING PROCESS METHOD

TECHNICAL FIELD

The present invention relates to a digital filter for a digital weigher (digital scale) which is applied to the digital weigher, and a digital weigher including the digital filter for the digital weigher. The present invention also relates to a wave filtering process method using the digital filter for the digital weigher.

BACKGROUND ART

In a digital weigher, an analog weighing signal of objects which is detected by a weight sensor such as a load cell is converted into a digital weighing signal and control processes are performed using the digital weighing signal. The digital weighing signal contains oscillating components of an oscillation unique to the digital weigher, a oscillation due to external causes, etc. The oscillating components are removed by using a digital filter.

In the digital filter, to remove an oscillating component in which its frequency characteristic is varying with a passage of time, like the oscillation due to the external causes, etc., of the oscillating components contained in digital weighing signal, a frequency range of the oscillating component to be removed is changed by changing a transfer function according to the digital weighing signal input. As a method of changing the transfer function, there are a method of re-calculating a filter coefficient and a method of changing a filter order (the number of unit filters).

However, in the method of re-calculating the filter coefficient, an amount of repeated calculation is great and complex calculation is necessary, which will increase a calculation time. That is, if the filter coefficient is re-calculated during weighing of the objects, a time that passes until the digital weighing signal falls within a predetermined allowable damping range (time that passes until the digital weighing signal becomes a usable weight value of the objects) will increase.

As a solution to this problem, for example, Patent Literature 1 discloses a digital filter in which it is determined whether or not an amplitude of an oscillating component contained in a digital weighing signal derived by performing a wave filtering process by a filter means falls within a predetermined allowable damping range in every predetermined sampling of the digital weighing signal in one weighing cycle, and a filter order of the filter means is increased if it is determined that the amplitude of the oscillating component does not fall within the predetermined allowable damping range, thereby changing a frequency range of an oscillating component to be removed by the filter means. According to this digital filter, the oscillating component to be removed is changed by changing the filter order of the filter means depending on whether or not the amplitude of the oscillating component contained in the digital weighing signal derived by performing the wave filtering process falls within the predetermined allowable damping range. Therefore, an amount of calculation in the wave filtering process in the filter means can be reduced.

CITATION LISTS

Patent Literature

Patent Literature 1 Japanese Patent No. 3394302

SUMMARY OF THE INVENTION

Technical Problem

However, in the method of changing the filter order like the digital filter disclosed in Patent Literature 1, since the transfer function does not change significantly, the amplitude of the oscillating component contained in the digital weighing signal derived by performing the wave filtering process may not converge into the allowable damping range, or a time that passes until it converges into the allowable damping range may become long, if there is a great difference between the frequency range to be capable of being removed by the preset filter coefficient and the frequency range of the oscillating component contained in the digital weighing signal. As a result, a weighing accuracy of the digital weigher becomes lower, or the calculation time in the filter increases and a weighing time increases. Especially, in a combination weigher which performs combination calculation, which is one example of the digital weigher, it is necessary to decrease a time (i.e., weighing cycle) for which one batch of objects are weighed with a higher speed of the combination calculation. Therefore, the increase in the weighing time is undesirable.

The present invention is directed to solving the above described problem, and an object of the present invention is to provide a digital filter for a digital weigher which is capable of reducing a calculation time in an adapted filter while maintaining a weighing accuracy, a digital weigher including the digital filter for the digital weigher, and a wave filtering process method using the digital filter for the digital weigher.

Solution to Problem

A digital filter for a digital weigher, of the present invention comprises: a FIR filter for performing a wave filtering process with respect to a digital weighing signal containing an oscillating component; a determination device for determining whether or not an amplitude of an oscillating component contained in a digital weighing signal derived by performing the wave filtering process by the FIR filter falls within a predetermined allowable damping range, in every predetermined sampling of the digital weighing signal within one weighing cycle; and a control device; wherein the FIR filter includes a fixation section for removing an oscillating component in a predetermined frequency range, and an adaptive section for removing an oscillating component in a changeable frequency range; and wherein the control device is configured to change the frequency range of the oscillating component which is to be removed by the adaptive section, based on a result of the determination performed by the determination device.

In accordance with the digital filter for the digital weigher, the fixation section of the FIR filter removes the oscillating component in the predetermined frequency range from the input digital weighing signal. Therefore, the assumed oscillating component such as a characteristic (natural) oscillation of the digital weigher, etc., can be removed surely. Since the adaptive section of the FIR filter changes the frequency range of the oscillating component to be removed from the input digital weighing signal, it is possible to remove the oscillating components generated due to shaking of the digital weigher which is caused by feeding objects to the digital weigher, or outside causes, during weighing.

Thus, from the input digital weighing signal, the fixation section removes an oscillating component in an assumed predetermined frequency range without performing calculation during one weighing cycle, and the adaptive section performs calculation to change the frequency range of the oscillating component to be removed by the adaptive section, only for the frequency range of the oscillating component generated irregularly. This makes it possible to reduce an amount of calculation in the wave filtering process in the FIR filter and reduce a time of the calculation in the FIR filter while preventing reduction of a weighing accuracy. As described above, in accordance with the present invention, the calculation time in the adapted filter can be reduced while maintaining a weighing accuracy.

In the digital filter for the digital weigher, the control device may be configured to change a filter coefficient of the adaptive section to change the frequency range of the oscillating component which is to be removed by the adaptive section. In accordance with this configuration, by changing the filter coefficient of the adaptive section, the frequency range of the oscillating component to be removed by the adaptive section can be changed significantly. Therefore, if it is determined that the digital weighing signal derived by performing the wave filtering process is less likely to fall within the allowable damping range based on a result of determination performed by the determination device, the control device changes the filter coefficient of the adaptive section, thereby damping the oscillating component of the digital weighing signal more surely and sooner. Thus, since the filter coefficient is changed only when necessary based on the result of the determination performed by the determination device, the number of times of calculation of the filter coefficient can be reduced.

In the digital filter for the digital weigher, the control device may be configured to change a filter order of the adaptive section by a predetermined number to change the frequency range of the oscillating component which is to be removed by the adaptive section. In this configuration, since the oscillating component to be removed is changed by changing the filter order of the adaptive section depending on whether or not the amplitude of the oscillating component contained in the digital weighing signal derived by performing the wave filtering process falls within the predetermined allowable damping range, the calculation amount of the wave filtering process in the adaptive section can be reduced.

In the digital filter for the digital weigher, the fixation section may be configured to remove a character (natural) frequency of a weight sensor of a digital weigher which weights objects, from the digital weighing signal input to the FIR filter. In accordance with this configuration, the fixation section removes the oscillating component based on the character frequency of the weight sensor of the digital weigher which component is a greatest oscillating component, the digital weighing signal derived by performing the wave filtering process can be damped to fall within the allowable damping range quickly. Thus, the calculation amount of the wave filtering process in the adaptive section can be further reduced.

In the digital filter for the digital weigher, the adaptive section may include lattice FIR filters of a predetermined number which are connected together. In accordance with this configuration, by using the lattice FIR filters as the adaptive section, a calculation error in the wave filtering process in the adaptive section can be lessened.

In the digital filter for the digital weigher, the fixation section may include lattice FIR filters of a predetermined number which are connected together. In accordance with this configuration, by using the lattice FIR filters as the fixation section, a calculation error in the wave filtering process in the fixation section can be lessened.

In the digital filter for the digital weigher, the fixation section may be configured to perform the wave filtering process with respect to the digital weighing signal input to the FIR filter; and the adaptive section may be configured to perform the wave filtering process with respect to the digital weighing signal derived by performing the wave filtering process by the fixation section. In accordance with this configuration, from the oscillating component contained in the digital weighing signal, the fixation section removes the assumed oscillating component, and then the adaptive section performs calculation to change the frequency range of the oscillating component to be removed by the adaptive section, to remove the remaining oscillating component. Therefore, the amount of calculation performed by the adaptive section can be reduced.

A digital weigher of the present invention comprises the digital filter for the digital weigher having any one of the above configurations. Since the digital weigher of the present invention comprises the digital filter for the digital weigher which can achieve the above advantages, a weighing speed of the digital weigher can be increased without decreasing a weighing accuracy of the digital weigher.

A wave filtering process method using a digital filter for a digital weigher, of the present invention, including an FIR filter for performing a wave filtering process with respect to a digital weighing signal containing an oscillating component; a determination device for determining whether or not an amplitude of an oscillating component contained in a digital weighing signal derived by performing the wave filtering process by the FIR filter falls within a predetermined allowable damping range, in every predetermined sampling of the digital weighing signal within one weighing cycle; and a control device; wherein the FIR filter includes a fixation section for removing an oscillating component in a predetermined frequency range, and an adaptive section for removing an oscillating component in a changeable frequency range; and wherein the control device is configured to change a filter coefficient of the adaptive section, based on a result of the determination performed by the determination device, comprises calculating a filter coefficient of the fixation section based on a sine wave corresponding to a character frequency of a weight sensor of a digital weigher; calculating a filter coefficient of a lattice filter of the adaptive section based on a predetermined integrated weighing signal; inputting the digital weighing signal to the digital filter for the digital weigher; and performing a wave filtering process with respect to the weighing digital signal input to the FIR filter, based on the filter coefficient calculated in the fixation section and the filter coefficient calculated in the adaptive section; wherein when the determination device determines that the filter coefficient should be changed after a specified weighing cycle, the control device calculates and updates the filter coefficient of the adaptive section based on the digital weighing signal in a previous weighing cycle.

In accordance with the wave filtering process method, since the filter coefficient of the fixation section is calculated based on the character frequency of the weight sensor of the digital weigher, the fixation section removes the oscillating component based on the character frequency of the weight sensor of the digital weigher which component is a greatest oscillating component from the assumed component. Since the filter coefficient of the adaptive section is calculated based on the predetermined integrated weighing signal, the frequency component to be removed by the adaptive section of the FIR filter can be set to the frequency range corresponding to the oscillating component which may be generated actually. When the filter coefficient is updated, the filter coefficient is calculated based on the digital weighing signal in a previous weighing cycle, so that the oscillating component generated actually can be removed by the adaptive section surely. This makes it possible to reduce the number of times the filter coefficient is updated in the adaptive section when the wave filtering process is performed using the digital filter. Therefore, the calculation time in the adapted filter can be reduced while maintaining a weighing accuracy.

Hereinafter, definition of terms used in claims and specification will be described.

The term "FIR filter" in claims and specification does not mean an actual filter circuit such as an electric circuit or an electronic circuit. The fact that the FIR filter performs the wave filtering process with respect to the digital weighing signal means that a control section (e.g., CPU of a microcomputer, etc.) of a controller performs control operation based on control programs stored in a memory section (e.g., internal memory of the microcomputer) of the controller to cause the digital weighing signal to go through a calculation process. The FIR filter changes due to the fact that a transfer function changes the filter coefficient and/or the filter order.

The term "one weighing cycle" in Claims and specification means a period that passes from when a digital weighing signal obtained by detecting a weight of particular objects is input until a weighing termination process of this objects is complete.

The term "integrated weighing signal" in Claims and specification means a signal which is derived by summing up a plurality of digital weighing signals obtained by actually weighing a plurality of objects or samples of the objects and averaging these digital weighing signals.

The above and further objects, features and advantages of the invention will more fully be apparent from the following detailed description with reference to the accompanying drawings.

Advantageous Effects of the Invention

The present invention has been configured as described above, and has an advantage that a calculation time in an adapted filter can be reduced while maintaining a weighing accuracy.

DESCRIPTION OF THE EMBODIMENTS

Figure 1:
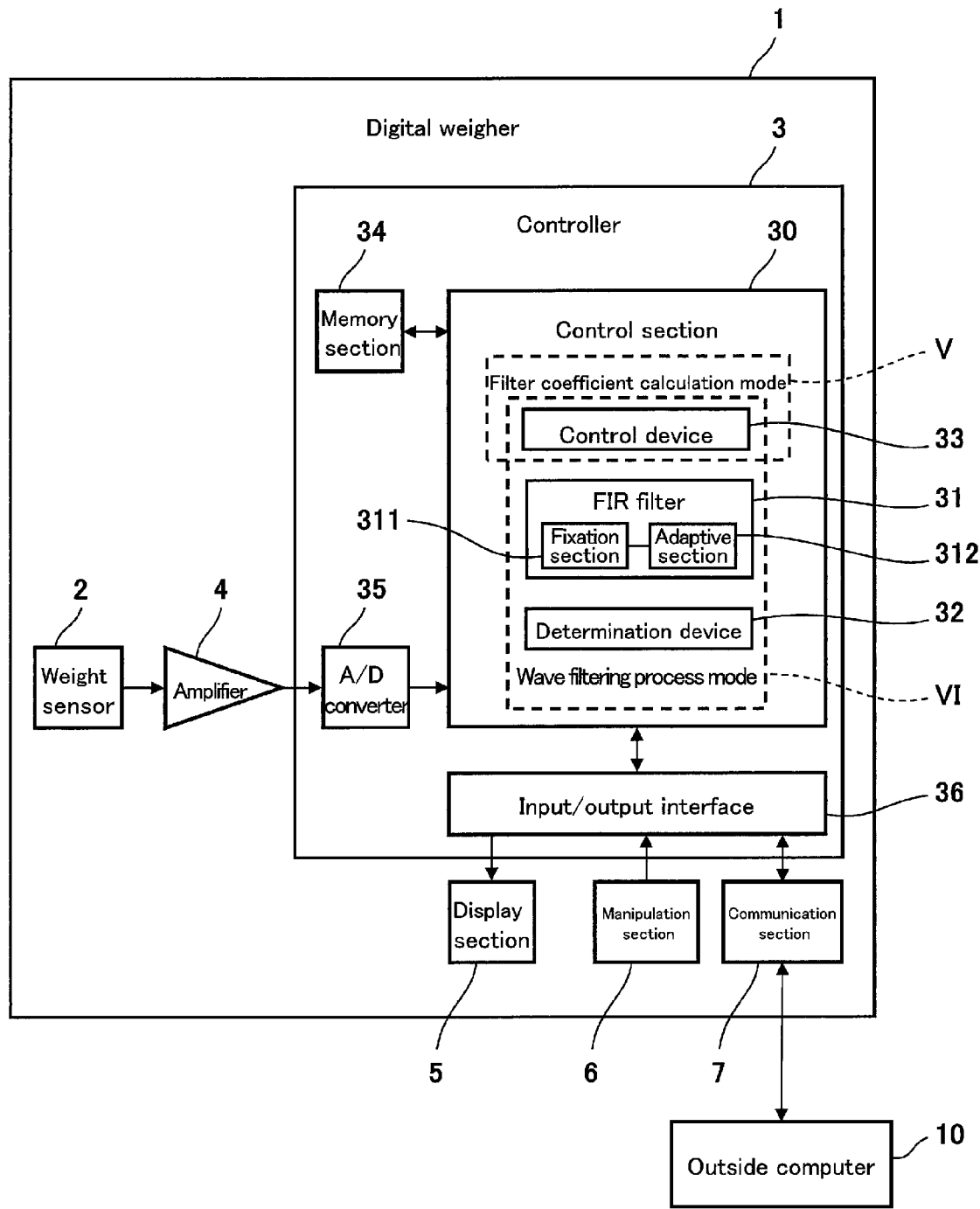
FIG. 1 is a block diagram showing a schematic configuration of a digital weigher to which a digital filter for a digital weigher according to an embodiment of the present invention is applied.

Hereinafter, preferred embodiments of the present invention will be described with reference to the drawings. Throughout the drawings, the same or corresponding components are designated by the same reference numerals and will not be described in repetition.

First of all, a schematic configuration of a digital weigher to which the digital filter for the digital weigher according to an embodiment of the present invention is applied will be described. FIG. 1 is a block diagram showing a schematic configuration of the digital weigher to which the digital filter for the digital weigher according to the embodiment of the present invention is applied.

As shown in FIG. 1, a digital weigher 1 of the embodiment includes a weight sensor 2 for weighing objects. As the weight sensor 2, for example, a load cell is used. The weight sensor 2 is connected to a controller 3. A weight detected by the weight sensor 2 is amplified by an amplifier 4 and the amplified signal is transmitted to the controller 3. Note that the amplifier 4 may be provided with a low pass filter for damping an unnecessary radio frequency component.

The controller 3 includes a control section 30 for performing calculation processes and a memory section 34 for storing data derived by the calculation processes. The controller 3 is configured as, for example, a control board (not shown) in which the control section 30 and the memory section 34 are mounted. The controller 3 includes, for example, a microcomputer. As the control section 30, for example, a CPU of a microcomputer is used. As the memory section 34, for example, an internal memory of this microcomputer is used. The control section 30 and the memory section 34 are interconnected. The memory section 34 contains control programs for a wave filtering process, etc. In addition, the memory section 34 contains data such as a filter coefficient, etc. The control section 30 reads outs control programs from the memory section 34 and executes the control programs, thereby performing processing such as calculation and the control processes. Alternatively, as the control section 30, a microcomputer for controlling actuation of a hopper or the like included in the digital weigher 1 may be used, or a microcomputer which is exclusively used for the wave filtering process in the digital filter, or a DSP (digital signal processor) may be used, separately from the microcomputer for controlling actuation.

The controller 3 includes an A/D converter 35 for converting an analog weighing signal into a digital weighing signal. The A/D converter 35 converts the analog weighing signal amplified by the amplifier 4 into a digital weighing signal and inputs the digital weighing signal to the control section 30. The digital weighing signal contains various oscillating components as well as a DC component corresponding to the weight of the objects.

The digital weigher 1 further includes a display section 5 for displaying data derived by processing performed by the controller 3, etc., a manipulation section 6 for performing inputting of settings of the controller 3, etc., and a communication section 7 communicable with an outside computer 10. The display section 5, the manipulation section 6, the communication section 7 and the control section 30 communicate signals via an input/output interface 36.

The control section 30 receives as inputs a signal from the A/D converter 35, a signal from the manipulation section 6 and a signal from the communication section 7. Based on these signals, the control section 30 activates a filter coefficient calculation mode and a wave filtering process mode. In the wave filtering process mode, the control section 30 performs a filter calculation process and a determination process. In the filter coefficient calculation mode, the control section 30 performs control for changing a filter order and a filter coefficient based on a result of the determination process, and stores data of the changed filter order and the changed filter coefficient, in the memory section 34. In other words, the control section 30 functions as a FIR (finite impulse response) filter 31, a determination device 32, and a control device 33. Therefore, the digital filter for the digital weigher of the present embodiment is implemented by the control section 30 which functions as the FIR filter 31, the determination device 32, and the control device 33.

Although the controller 3 is configured by one control board in the present embodiment, the present invention is not limited to this so long as similar control is performed. Specifically, for example, a plurality of control boards may be provided as corresponding to the control processes and the controller 3 may be configured by the plurality of control boards. Or, the controller 3 is not necessarily incorporated into the digital weigher 1. For example, a personal computer or the like may be connected to the digital weigher 1 as the controller 3 provided outside, and this outside controller 3 may perform the control.

In the digital filter for the digital weigher of the present embodiment, the control section 30 which functions as the FIR filter 31 performs wave filtering process with respect to the digital weighing signal containing an oscillating component which is received as an input from the A/D converter 35.

To be more specific, the FIR filter 31 includes a fixation section 311 for removing an oscillating component in a predetermined frequency range and an adaptive section 312 for removing an oscillating component in a changeable frequency range. Therefore, from the weighing signal input from the A/D converter 35, the fixation section 311 removes the predetermined oscillating component which is assumed, such as a character (natural) frequency of the digital weigher, etc., and the adaptive section 312 removes oscillating components generated due to, for example, opening and closing of hoppers provided in a combination weigher which is the digital filter 1, or outside causes, during weighing.

The control section 30 which functions as the determination device 32 determines whether or not an amplitude of the oscillating component contained the digital weighing signal derived by performing the wave filtering process in the FIR filter 31 falls within a predetermined allowable damping range, in every predetermined sampling of the digital weighing signal during one weighing cycle. Then, based on a result of the determination performed by the determination device 32, the control device 33 changes a frequency component of the oscillating component to be removed by the adaptive section 312, to remove an oscillating component which has not been removed by the fixation section 311, of the oscillating components contained in the input digital weighing signal. In the present embodiment, one weighing cycle means a period that passes from when a digital weighing signal obtained by detecting a weight of particular objects is input until a weighing termination process (discharge process) of this objects is complete.

In the above described manner, from the input digital weighing signal, the fixation section 311 removes an oscillating component in an assumed predetermined frequency range without performing calculation during the weighing, and the adaptive section 312 performs calculation to change a frequency range of an oscillating component to be removed by the adaptive section 312, only for the frequency range of the oscillating component generated irregularly. This makes it possible to reduce an amount of calculation in the wave filtering process in the adaptive section 312 and reduce a time of the calculation in the adaptive section 312 while preventing reduction of a weighing accuracy. Thus, in accordance with the digital filter for the digital weigher of the present embodiment, it is possible to reduce the calculation time in the adapted filter, while maintaining the weighing accuracy.

In the present embodiment, if it is determined that amplitude of the oscillating component after the wave filtering process has been performed does not fall within the allowable damping range, the control section 30 changes the frequency range of the oscillating component to be removed by the adaptive section 312 by increasing the filter order of the adaptive section 312 by a predetermined number. This makes it possible to reduce the calculation amount of the wave filtering process in the adaptive section 312. The adaptive section 312 is composed of m unit filters (described later) which are connected together. The number m of the connected unit filters corresponds to the filter order.

Figure 2:
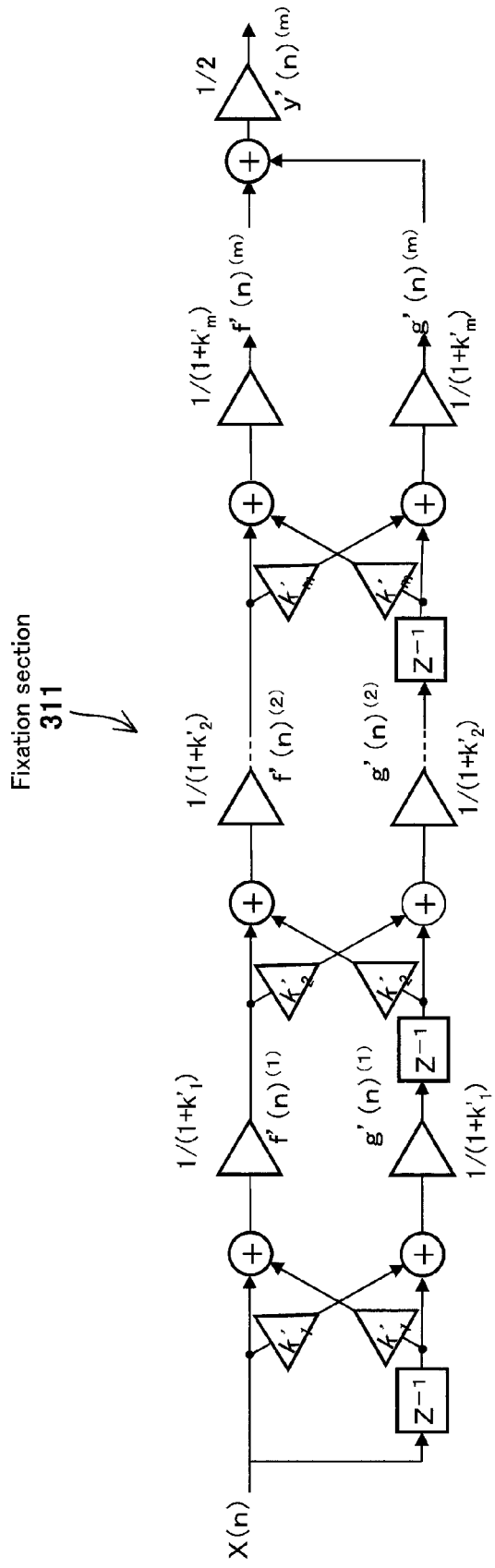
FIG. 2 is a block diagram showing a specific example of a fixation section of a FIR filter provided in the digital filter for the digital weigher in the digital weigher of FIG. 1.
Figure 3:
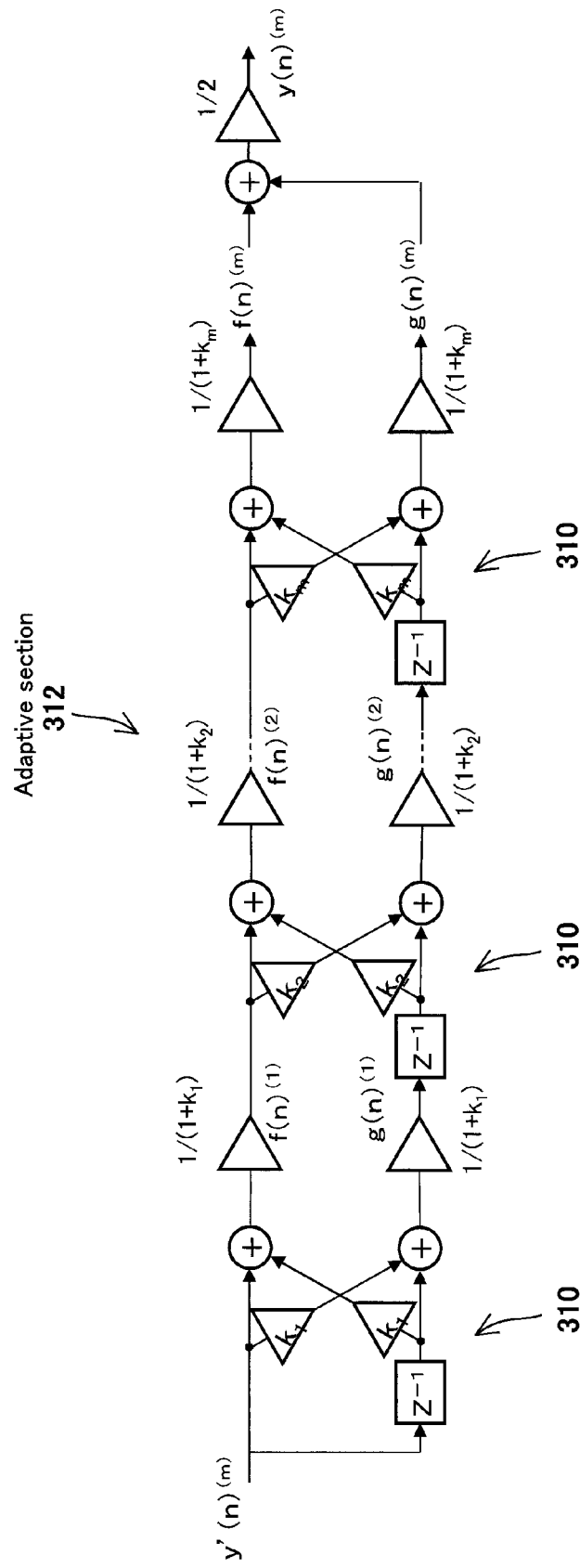
FIG. 3 is a block diagram showing a specific example of an adaptive section of the FIR filter provided in the digital filter for the digital weigher in the digital weigher of FIG. 1.
Figure 4:
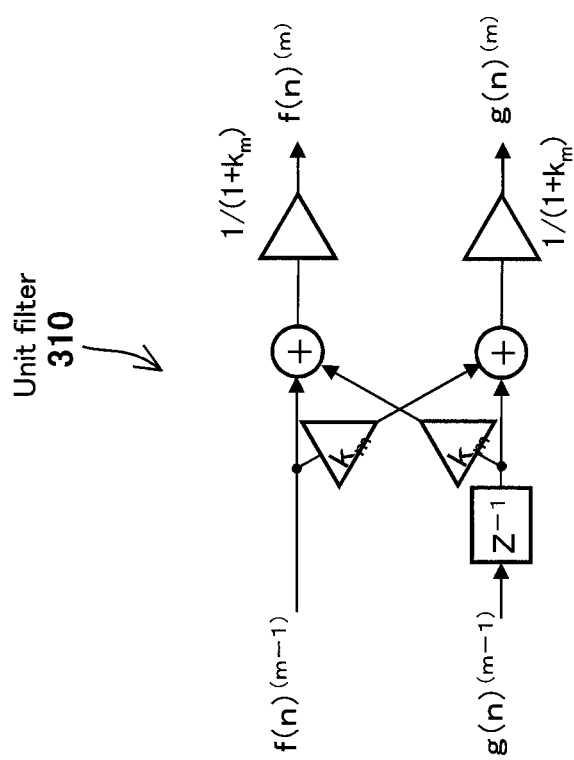
FIG. 4 is a block diagram showing a specific example of a unit filter of the adaptive section of the FIR filter provided in the digital filter for the digital weigher in the digital weigher of FIG. 1.

Now, the configuration of the FIR filter 31 will be described in more detail. FIGS. 2 to 4 are block diagrams showing specific examples of the FIR filter included in the digital filter for the digital weigher in the digital weigher of FIG. 1. FIG. 2 is a block diagram showing the fixation section. FIG. 3 is a block diagram showing the adaptive section. FIG. 4 is a block diagram showing the unit filter of the adaptive section. As described above, the FIR filter shown in FIGS. 2 to 4 does not mean an actual filter circuit constituted by an electric circuit, an electronic circuit, etc., but is configured by the control section 30 which controls the operation based on the control programs stored in the memory section 34.

First of all, the adaptive section 312 of FIG. 3 will be described. The adaptive section 312 is composed of m unit filters 310 of FIG. 4 which are connected in series when the adaptive section 312 is expressed in a virtual manner. The phrase "m unit filters 310 which are connected in series" means that the control section 30 repeats calculation in the unit filter 310 m times while changing the filter coefficient (in the present embodiment, reflection coefficient $k_m$ as will be described later) according to the filter order m ($k_1$, $k_2$, ... $k_m$). The unit filter 310 of the present embodiment is configured as a lattice FIR filter. By using the lattice FIR filter, a calculation error in the wave filtering process in the adaptive section 312 can be lessened.

The adaptive section 312 has a configuration in which m lattice FIR filters which are the unit filters 310 are connected in series. The lattice FIR filter outputs a forward prediction error $f(n)^{(m)}$ and a backward prediction error $g(n)^{(m)}$ to two inputs $f(n)^{(m-1)}$ and $g(n)^{(m-1)}$. In a configuration in the unit filters 310 are connected in series, the forward prediction error $f(n)^{(m)}$ and the backward prediction error $g(n)^{(m)}$ are input to the unit filter 310 in a subsequent stage. The unit filter 310 has a predetermined reflection coefficient $k_m$. That is, virtually, the adaptive section 312 is configured such that m unit filters 310 having the same configuration and being different from each other in the reflection coefficient $k_m$ depending on the connection number (filter order) m.

A relationship among the reflection coefficient $k_m$, the forward prediction error $f(n)^{(m)}$ and the backward prediction error $g(n)^{(m)}$ are expressed by the following formula (1) to the formula (4). x(n) indicates the digital weighing signal (input signal), and n (n=0, 1, 2, ..., N) indicates a sampling number. The connection number m (m=1, 2, ... M) of the unit filters 310 is indicated by the filter order in the following formulae.

$$k_m = \frac{-2\sum_{n=m}^{N-1} f(n)^{(m-1)} g(n-1)^{(m-1)}}{\sum_{n=m}^{N-1} \{[f(n)^{(m-1)}]^2 + [g(n-1)^{(m-1)}]^2\}} \quad (1)$$

$$f(n)^{(m)} = \frac{f(n)^{(m-1)} + k_m \cdot g(n-1)^{(m-1)}}{1 + k_m} \quad (2)$$

$$g(n)^{(m)} = \frac{g(n-1)^{(m-1)} + k_m \cdot f(n)^{(m-1)}}{1 + k_m} \quad (3)$$

$$f(n)^{(0)} = g(n)^{(0)} = x(n) \quad (4)$$

The adaptive section 312 has a predetermined filter coefficient $a_i^{(m)}$. When a transfer function F(z) of the adaptive section 312 is expressed using the filter coefficient $a_i^{(m)}$, the following formula (5) is derived:

$$F(z) = \frac{1}{2\left(1 + \sum_{i=1}^{m} a_i^{(m)}\right)} \{1 + a_m^{(m)} + (a_1^{(m)} + a_{m-1}^{(m)})z^{-1} + \ldots + (1 + a_m^{(m)})z^{-m}\} \quad (5)$$

The filter coefficient $a_i^{(m)}$ and the reflection coefficient $k_m$ have a relationship expressed by the following formula (6).

$$a_i^{(m)} = a_i^{(m-1)} + k_m \cdot a_{m-i}^{(m-1)} \ldots (i=1,2,\ldots,m-1)$$

$$a_i^{(m)} = k_m \ldots (i=m) \quad (6)$$

An output signal $y(n)^{(m)}$ of the adaptive section 312 which is derived by performing the wave filtering process using the transfer function (Fz) in the formula (5) is expressed as the following formula (7).

$$y(n)^{(m)} = \frac{f(n)^{(m)} + g(n)^{(m)}}{2} \quad (7)$$

Thus, by performing calculation according to the formula (1) to the formula (4) and the formula (7) and processing the input digital weighing signal x (n) (in the present embodiment, y' $(n)^{(m)}$ as will be described later), it is possible to derive the output signal $y(n)^{(m)}$ of the adaptive section 312. In the unit filter 310 of the present embodiment, the forward prediction error $f(n)^{(m)}$ and the backward prediction error $g(n)^{(m)}$ are multiplied by $1/(1+k_m)$ by multipliers and are output. Therefore, a steady gain is 1. Therefore, the steady gain of the adaptive section 312 can be made constant and 1 irrespective of the connection number (filter order m) of the unit filters 310. However, the present invention is not limited to this. For example, instead of connecting the multipliers to each of the unit filters 310, the forward prediction error $f(n)^{(m)}$ and the backward prediction error $g(n)^{(m)}$, which are finally output, may be multiplied by a multiplication value corresponding to the filter order m at that point of time.

As can be seen from the formula (5), when the filter order, namely, the connection number m of the unit filters 310 changes, the transfer function F(z) of the adaptive section 312 changes. Also, when the filter coefficient $a_i^{(m)}$ changes, the transfer function F(z) of the adaptive section 312 changes. The fact that the filter coefficient $a_i^{(m)}$ changes has the same meaning as in the fact that the reflection coefficient $k_m$ changes. Thus, by changing the filter order m and/or the filter coefficient $a_i^{(m)}$ (reflection coefficient $k_m$), it becomes possible to change the frequency range of the oscillating component to be removed by the adaptive section 312. A tap number L of the transfer function F(z) is L=m+1.

Subsequently, the fixation section 311 of FIG. 3 will be described. The fixation section 311 is configured such that M' (m=1, 2, ..., M') lattice FIR filters similar to the unit filters 310 of FIG. 4 are connected together, as in the adaptive section 312. By using the lattice FIR filters, a calculation error in the wave filtering process in the fixation section 311 can be lessened.

A relationship between a filter coefficient $a'_i^{(m)}$ and a reflection coefficient $k'_m$ in the fixation section 311 is found as in the relationship in the adaptive section 312. Therefore, an output y' $(n)^{(m)}$ of the fixation section 311 corresponding to the digital weighing signal x (n) can be derived.

The above stated digital weigher 1 is applicable to, for example, the combination weigher. In this case, the combination weigher includes a plurality of weight sensors 2, the corresponding plurality of amplifiers 4, a multiplexer (not shown) to which signals output from the plurality of amplifiers 4 are input, respectively, and a controller 3. An analog weighing signal detected by each of the plurality of weight sensors 2 is amplified by the corresponding amplifier 4, and input to the A/D converter 35 of the controller 3 via the multiplexer. The analog weighing signal input to the A/D converter 35 is digitized in the A/D converter 35 and output as a digital weighing signal x (n). The digital weighing signal x(n) is input to the control section 30. The digital weighing signal x(n) goes through the wave filtering process in the control section 30 serving as the FIR filter 31. The control section 30 outputs the output signal y $(n)^{(m)}$ derived by the wave filtering process. The output signal y $(n)^{(m)}$ derived by the wave filtering process is converted into a weight value in the control section 30. The converted weight value is stored in the memory section 34 and displayed on the display section 5.

Figure 5:
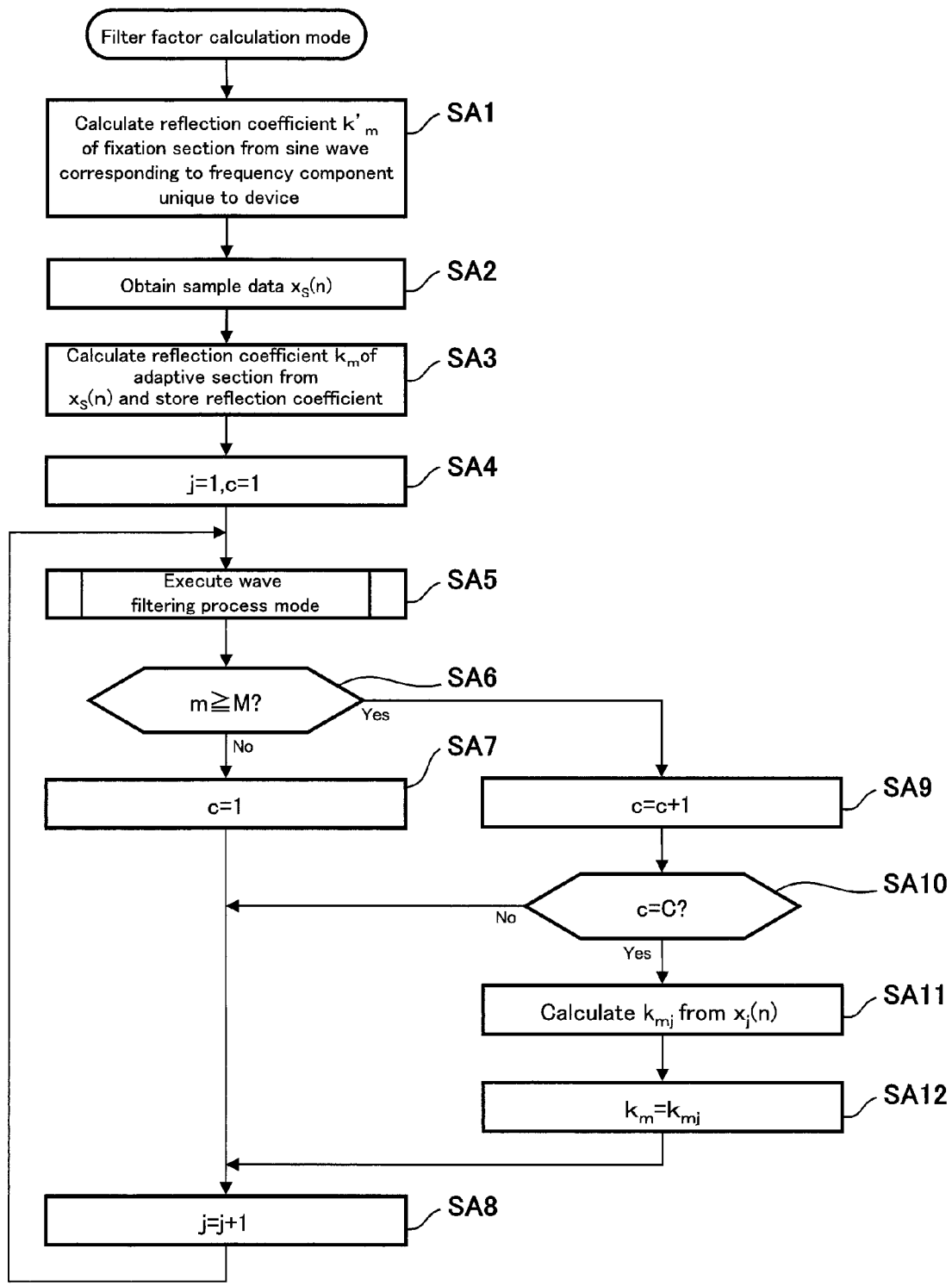
FIG. 5 is a flowchart showing a control operation in a filter coefficient calculation mode in the digital filter for the digital weigher of the embodiment.
Figure 6:
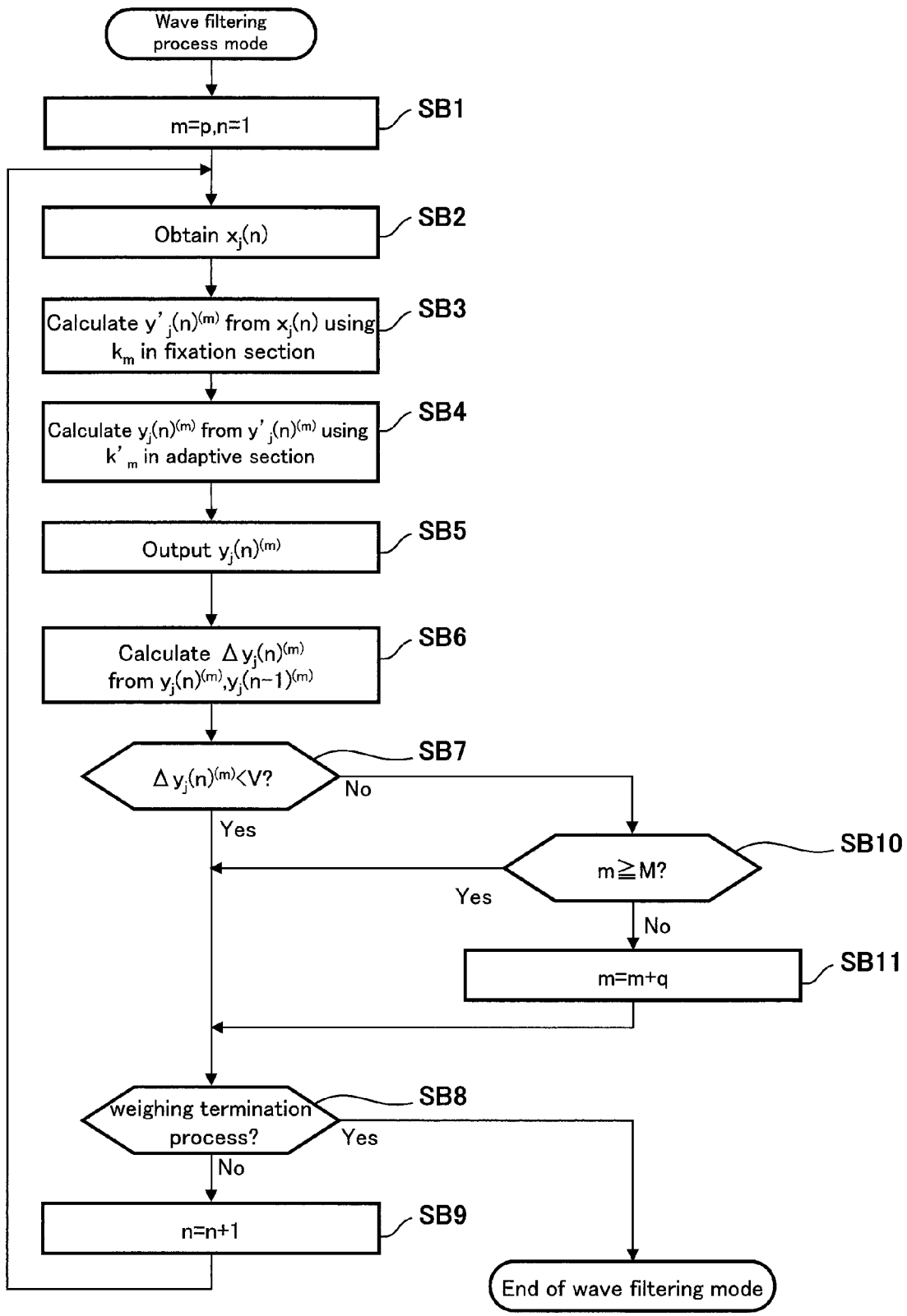
FIG. 6 is a flowchart showing a control operation in a wave filtering process mode in the digital filter for the digital weigher of the embodiment.

Subsequently, a detailed description will be given of a flow of the wave filtering process in the digital filter for the digital weigher a wave filtering process method using the digital filter for the digital weigher according to the present embodiment. FIG. 5 is a flowchart showing a control operation in the filter coefficient calculation mode in the digital filter for the digital weigher of the present embodiment. FIG. 6 is a flowchart showing the control operation in the wave filtering process mode in the digital filter for the digital weigher of the present embodiment.

Prior to performing the wave filtering process, the control section 30 initiates the filter coefficient calculation mode of FIG. 5 to set the reflection coefficient $k'_m$ of the fixation section 311 and reflection coefficient $k_m$ of the adaptive section 312. In the filter coefficient calculation mode, initially, the control section 30 calculates the reflection coefficient $k'_m$ of the fixation section 311 in the FIR filter 31, and stores the reflection coefficient $k'_m$ in the memory section 34 (step SA1). Specifically, the control section 30 calculates the reflection coefficient $k'_m$ of the fixation section 311 in such a manner that a sine wave corresponding to a character (natural) frequency of the weight sensor 2 of the digital weigher is input as a sample signal to a reflection coefficient calculation filter.

In addition, the control section 30 calculates the reflection coefficient $k_m$ of the adaptive section 312 in the FIR filter 31, and stores the reflection coefficient $k_m$ in the memory section 34 (step SA2, step SA3). Specifically, the control section 30 obtains sample data $x_s(n)$ relating to a digital weighing signal (step SA2). The control section 30 calculates the reflection coefficient $k_m$ of the adaptive section 312 in such a manner that the sample data $x_s(n)$ is input to the reflection coefficient calculation filter (step SA3). The sample data $x_s(n)$ may be, for example, a digital weighing signal obtained by actually weighing objects or a sample of the objects, an integrated weighing signal which is derived by summing up a plurality of digital weighing signals obtained by actually weighing plural pieces of objects or samples of the objects and averaging these digital weighing signals, or a signal derived by performing the wave filtering process with respect to the digital weighing signal or the integrated weighing signal by a filter.

Figure 7:
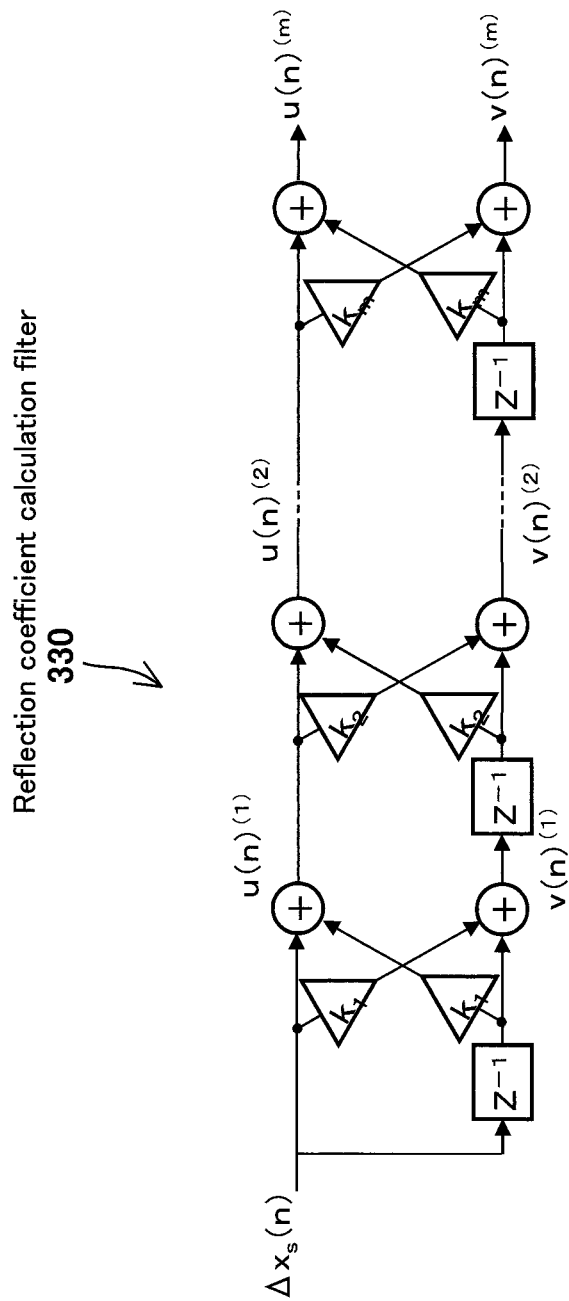
FIG. 7 is a block diagram showing a reflection coefficient calculation filter in the digital filter for the digital weigher of the embodiment.

FIG. 7 is a block diagram showing the reflection coefficient calculation filter in the digital filter for the digital weigher of the present embodiment. Although in the present embodiment, the reflection coefficient calculation filter is used separately from the wave filtering process filter, the respective reflection coefficients may be calculated based on the wave filtering process filter (i.e., filter shown in FIGS. 2 and 3).

Now, an example in which the reflection coefficient $k_m$ of the adaptive section 312 is calculated will be described. A reflection coefficient calculation filter 330 of FIG. 7 is configured in such a manner that m (filter order: m) unit filters (unit filters each of which is obtained by omitting a forward multiplier at an output side and a backward multiplier at an output side from the unit filter 310 of FIG. 5) are connected together. When a transfer function of the reflection coefficient calculation filter 330 is H(z), a forward prediction error generated when a difference value $\Delta x_s(n) = x_s(n) - x_s(n-1)$ of the sample data $x_s(n)$ in a discrete time series is input to the reflection coefficient calculation filter 330 is $u(n)^{(m)}$, and a backward prediction error generated when the difference value $\Delta x_s(n)$ is input to the reflection coefficient calculation filter 330 is $v(n)^{(m)}$, the reflection coefficient $k_m$ and the filter coefficient $a_i^{(m)}$ have a relationship expressed as follows.

$$k_m = \frac{-2\sum_{n=m}^{N-1} u(n)^{(m-1)} v(n-1)^{(m-1)}}{\sum_{n=m}^{N-1} \{[u(n)^{(m-1)}]^2 + [v(n-1)^{(m-1)}]^2\}} \quad (8)$$

$$u(n)^{(m)} = u(n)^{(m-1)} + k_m \cdot v(n-1)^{(m-1)} \quad (9)$$

$$v(n)^{(m)} = v(n-1)^{(m-1)} + k_m \cdot u(n)^{(m-1)} \quad (10)$$

$$u(n)^{(0)} = v(n)^{(0)} = \Delta x_s(n) \ldots (n = 1, 2, \ldots, m-1) \quad (11)$$

$$H(z) = \frac{1}{2\left(1 + \sum_{i=1}^{m} a_i^{(m)}\right)} \{1 + a_m^{(m)} + (a_1^{(m)} + a_{m-1}^{(m)})z^{-1} + \ldots + (1 + a_m^{(m)})z^{-m}\} \quad (12)$$

$$a_i^{(m)} = a_i^{(m-1)} + k_m \cdot a_{m-i}^{(m-1)} \ldots (i = 1, 2, \ldots, m-1) \quad (13)$$
$$a_i^{(m)} = k_m \ldots (i = m)$$

$$\Delta x_s(n) = -a_1^{(m)} \cdot \Delta x_s(n-1) - \ldots - a_m^{(m)} \cdot \Delta x_s(n-m) + u(n)^{(m)} \quad (14)$$

The transfer function H(z) in the formula (12) can be filtered with a greater damping ratio with respect to a frequency range in which a lasting oscillating component contained in the sample data $x_s(n)$ is present. Because of this, the filter order m in the wave filtering process can be relatively lessened.

According to the above formulae (8) to (14), the reflection coefficient $k_m$ (m=1, 2, ... M) of the adaptive section 312 is calculated. The reflection coefficient $k'_m$ (m=1, 2, ... M') of the fixation section 311 is calculated in the same manner by converting an input signal into a sine wave corresponding to the character (natural) frequency of the weight sensor 2 of the digital weigher. Maximum values M and M' of the filter order m in this case are not particularly limited, but calculation up to relatively greater values is preferable. For example, setting is made such that M=40 and M'=20. The reflection coefficient $k_m$ and the reflection coefficient $k'_m$ calculated as described above are stored in the memory section 34.

As shown in FIG. 1, the reflection coefficient $k'_m$ of the fixation section 311 and/or the reflection coefficient $k_m$ of the adaptive section 312 may be calculated in the outside computer 10 connected via the communication section 7 of the digital weigher 1 as shown in FIG. 1.

The wave filtering process is carried out using the fixation section 311 in which the reflection coefficient $k'_m$ is set and the adaptive section 312 in which the reflection coefficient $k_m$ is set. In the wave filtering process, initial setting is performed such that a weighing cycle number j=1 and a counter c=1 are set as will be described later (step SA4). The control section 30 executes the wave filtering process mode as described below, using the set weighing cycle number j and the set counter c (step SA5). The wave filtering process mode may be initiated in response to an operator's mode switch manipulation, or otherwise, the control section 30 may initiate the wave filtering process mode automatically.

In the wave filtering process mode, as shown in FIG. 6, initial setting is performed such that the filter order m=p of the adaptive section 312 and the sampling number n=1 are set (step SB1). The initial set value p of the filter order m of the adaptive section 312 is not particularly limited. For example, p=20. Although not shown, the filter order m of the fixation section 311 is set to a predetermined value M' (fixed value). Although the fixed value M' of the filter order m of the fixation section 311 is not particularly limited, for example, M'=20.

The control section 30 obtains a digital input signal $x_j$ (n) (j=1, 2, . . . )(step SB2). The weighing cycle number j is given to mean an order of a plurality of input signals sent from the weight sensor 2, for the sake of convenience. The fact that the weighing cycle number j increases by 1 means that shifting to a subsequent weighing cycle occurs. The control section 30 inputs the obtained digital input signal $x_j$ (n) to the fixation section 311 of the FIR filter 31, and calculates the output signal $y'_j$ $(n)^{(m)}$ and outputs the output signal $y'_j$ $(n)^{(m)}$ (step SB3). That is, the fixation section 311 in the control section 30 calculates the formula (1) to the formula (4) and the formula (7) based on the obtained digital input signal $x_j$ (n), the set reflection coefficient $k'_m$, and the set filter order m, and outputs the output signal $y'_j$ $(n)^{(m)}$.

Further, the control section 30 inputs the signal $y'_j$ $(n)^{(m)}$ output from the fixation section 311 to the adaptive section 312, which calculates and outputs the output signal $y_j$ $(n)^{(m)}$(step SB4). That is, the adaptive section 312 in the control section 30 calculates the formula (1) to the formula (4) and the formula (7) based on the input signal $y'_j$ $(n)^{(m)}$, the set reflection coefficient $k_m$, and the set filter order m, and outputs the output signal $y_j$ $(n)^{(m)}$. The control section 30 stores in the memory section 34 the signal $y_j$ $(n)^{(m)}$ output from the adaptive section 312, and causes the display section 5 to display the signal $y_j$ $(n)^{(m)}$ via the input/output interface 36 (step SB5).

Then, the control section 30 operates as the determination device 32. That is, the control section 30 determines whether or not an amplitude of an oscillating component contained in the digital weighing signal $y_j(n)^{(m)}$ derived by performing wave filtering process in the FIR filter 31 falls within a predetermined allowable damping range V (step SB6, SB7). Specifically, firstly, the control section 30 calculates a change amount $\Delta y_j$ $(n)^{(m)}$ from the digital weighing signal $y_j$ $(n)^{(m)}$ output from the adaptive section 312 and a digital weighing signal $y_j$ $(n-1)^{(m)}$ output from the adaptive section 312 in previous sampling (step SB6). In the present embodiment, the change amount $\Delta y_j$ $(n)^{(m)}$ is expressed as the following formula (15). The change amount $\Delta y_j$ $(n)^{(m)}$ has a predetermined magnitude u (u=0, 1, 2, . . . , w) based on the sampling number n.

$$\Delta y_j(n)^{(m)} = \sum_{u=0}^{w} \{| y_j(n-u)^{(m)} - y_j(n-1-u)^{(m)}|\} \quad (15)$$

Instead of calculating the change amount $\Delta y_j$ $(n)^{(m)}$ using the formula (15), for example, the change amount $\Delta y_j$ $(n)^{(m)}$ may be calculated by adding moving average of the digital weighing signal $y_j$ $(n)^{(m)}$.

The controller 30 reads the predetermined allowable damping range V stored in the memory section 34 and compares the predetermined allowable damping range V to the calculated change amount $\Delta y_j$ $(n)^{(m)}$ (step SB7). When it is determined that the change amount $\Delta y_j$ $(n)^{(m)}$ is less than the allowable damping range V, i.e., the digital weighing signal $y_j(n)^{(m)}$ derived by performing the wave filtering process has been damped adequately (Yes in step SB7), the control section 30 determines whether or not a weighing termination process (discharge process in the case of the combination weigher) has been performed (step SB8). If it is determined that the weighing termination process has been performed (Yes in step SB8), the wave filtering process mode is terminated. On the other hand, if it is determined that the weighing termination process has not been performed (No in step SB8), the control section 30 adds 1 to the sampling number n (step SB9), and performs sampling of a subsequent digital weighing signal $x_j$ (n) (n=n+1) (step SB2). Thereafter, until the weighing termination process has been performed (Yes is attained in step SB8), the step SB2 to the step SB9 are repeated. In the case of the combination weigher, combination calculation is performed based on the signal $y_j(n)^{(m)}$ which is stored sequentially in the memory section 34.

When the change amount $\Delta y_j$ $(n)^{(m)}$ is greater than the allowable damping range V, i.e., the digital weighing signal $y_j(n)^{(m)}$ derived by performing wave filtering process has not been damped adequately (No in step SB7), the control section 30 determines whether or not the filter order m is equal to or greater than the maximum value M (step SB10). If it is determined that the filter order m is less than the maximum value M (No in step SB10), the control section 30 operates as the control device 33 and increases the filter order m of the adaptive section 312 by a predetermined number q (e.g., q=1) (step SB11). Then, in subsequent sampling (sampling number n=n+1), the adaptive section 312 with the filter order (m+q) performs the wave filtering process in step SB4. If it is determined that the filter order m is equal to or greater than the maximum value M (Yes in step SB10), the control section 30 performs the following sampling without increasing the filter order m of the adaptive section 312 until the weighing termination process is performed (step SB8, SB9). Since the oscillating component to be removed is changed by changing the filter order m (connection number m of the unit filters 330 in the adaptive section 312) of the adaptive section 312 depending on whether or not the amplitude of the oscillating component contained in the digital weighing signal $y_j(n)^{(m)}$ derived by performing the wave filtering process falls within the predetermined allowable damping range V, an amount of calculation in the wave filtering process in the adaptive section 312 can be reduced. If the amplitude does not become less than the allowable damping range V even though the sampling is repeated a predetermined number of times after the filter order m has reached the maximum value M or greater, the control section 30 determines that the reflection coefficient $k_m$ should be updated and outputs information indicating an error, although this is not shown.

If it is determined that the weighing termination process has been performed (Yes in step SB8), the control section 30 terminates the wave filtering process mode automatically or in response to a mode switch manipulation, and returns to the filter coefficient calculation mode. As shown in FIG. 5, the control section 30 determines whether or not the filter order m of the adaptive section 312, corresponding to the digital weighing signal $y_j(n)^{(m)}$ derived by performing the calculation in the wave filtering process mode, has reached the maximum value M or greater (step SA6). If it is determined that the filter order m of the adaptive section 312 has not reached the maximum value M or greater (No in step SA6), the control section 30 resets the counter c and increases the weighing cycle number j by 1 in a state of c=1 (step SA8). The control section 30 performs the wave filtering process with respect to the digital weighing signal $x_j(n)$ (j=j+1) which is input subsequently (step SA5). Note that at start of a subsequent weighing cycle, the filter order m of the adaptive section 312 is re-set to the initial set value p (step SB1).

If it is determined that the filter order m of the adaptive section 312 has reached the maximum value M or greater (Yes in step SA6), the control section 30 increases the counter c by 1 (step SA9), and determines whether or not the counter c has become a predetermined value C (step SA10). That is, the control section 30 determines whether or not the filter order m of the adaptive section 312 has reached the maximum value M or greater continuously in weighing cycles of the preset number of times C. If it is determined that the counter c has not become the predetermined value C (No in step SA10), the control section 30 increases the weighing cycle number j by 1 without resetting the counter C (step SA8).

If it is determined that the counter c has become the predetermined value C (Yes in step SA10), the control section 30 operates as the control device 33, and changes the filter coefficient $a_i^{(m)}$ of the adaptive section 312 to change the frequency range of the oscillating component to be removed by the adaptive section 312 (step SA11, SA12). More specifically, the control section 30 calculates the filter coefficient $a_i^{(m)}$ of the adaptive section 312 based on the digital weighing signal $x_j(n)$ in a previous weighing cycle. Specifically, the control section 30 inputs the difference value $\Delta x_j(n) = x_j(n) - x_j(n-1)$ of the digital weighing signal $x_j(n)$ in a discrete time series to the reflection coefficient calculation filter 330 of FIG. 7, and calculates the reflection coefficient $k_{mj}$ of the adaptive section 312 based on the formula (8) to the formula (14) (step SA11). Then, the control section 30 sets the calculated reflection coefficient $k_{mj}$ as the reflection coefficient $k_m$ of the adaptive section 312 (step SA12), and executes a subsequent (j=j+1) weighing cycle (step SA8, SA5).

By changing the filter coefficient $a_i^{(m)}$ of the adaptive section 312, the frequency range of the oscillating component to be removed by the adaptive section 312 can be changed significantly. Therefore, if it is determined that the digital weighing signal $y_j(n)^{(m)}$ derived by performing the wave filtering process is less likely to fall within the allowable damping range V based on a result of determination in a particular weighing cycle which is performed by the determination device 32, the control device 33 changes the filter coefficient $a_i^{(m)}$ of the adaptive section 312, thereby damping the oscillating component of the digital weighing signal $x_j(n)$ in the following weighing cycles more surely and sooner. Thus, since the filter coefficient $a_i^{(m)}$ is changed only when necessary based on the result of the determination performed by the determination device 32, the number of times of calculation of the filter coefficient $a_i^{(m)}$ can be reduced. Although in the present embodiment, the determination device 32 performs determination in every sampling of the digital weighing signal $x_j(n)$, the present invention is not limited to this. For example, the determination device 32 may perform determination as to the digital weighing signal $y_j(n)^{(m)}$ derived by performing the wave filtering process, once in every samplings of a predetermined number of times.

As described above, from the input digital weighing signal $x_j(n)$, the fixation section 311 removes the oscillating component in the assumed predetermined frequency range without performing calculation during one weighing cycle, and the adaptive section 312 performs calculation to change the frequency range of the oscillating component to be removed by the adaptive section 312, only for the frequency range of the oscillating component generated irregularly. This makes it possible to reduce an amount of calculation in the wave filtering process in the FIR filter 31 and reduce the calculation time while avoiding a reduction of weighing accuracy.

In the present embodiment, as described above, the fixation section 311 and then the adaptive section 312 perform the wave filtering process with respect to the input digital weighing signal $x_j(n)$. Thereby, from the oscillating component contained in the digital weighing signal $x_j(n)$, the fixation section 311 removes the assumed oscillating component, and then the adaptive section 312 performs calculation to change the frequency range of the oscillating component to be removed by the adaptive section 312, to remove the remaining oscillating component. Therefore, the amount of calculation performed by the adaptive section 312 can be reduced.

Furthermore, since the filter coefficient (reflection coefficient $k'_m$) in the fixation section 311 is calculated based on the character (natural) frequency of the weight sensor 2 of the digital weigher 1, the fixation section 311 removes the oscillating component corresponding to the character (natural) frequency of the weight sensor 2 of the digital weigher 1, which component is a greatest oscillating component, from the assumed oscillating component. Since the filter coefficient (reflection coefficient $k_m$) in the adaptive section 312 is calculated based on a predetermined integrated weighing signal, the FIR filter 31 can set the frequency component to be removed by the adaptive section 312 to a frequency range adapted to an oscillating component which may be generated actually. When the filter coefficient is updated, the filter coefficient is calculated based on the digital weighing signal in a previous weighing cycle. Therefore, the oscillating component generated actually can be removed surely by the adaptive section 312. This makes it possible to reduce the number of times the filter coefficient is updated in the adaptive section 312 when the wave filtering process is performed using the digital weigher. Therefore, the calculation time in the adapted filter can be reduced while maintaining a weighing accuracy.

Figure 8:
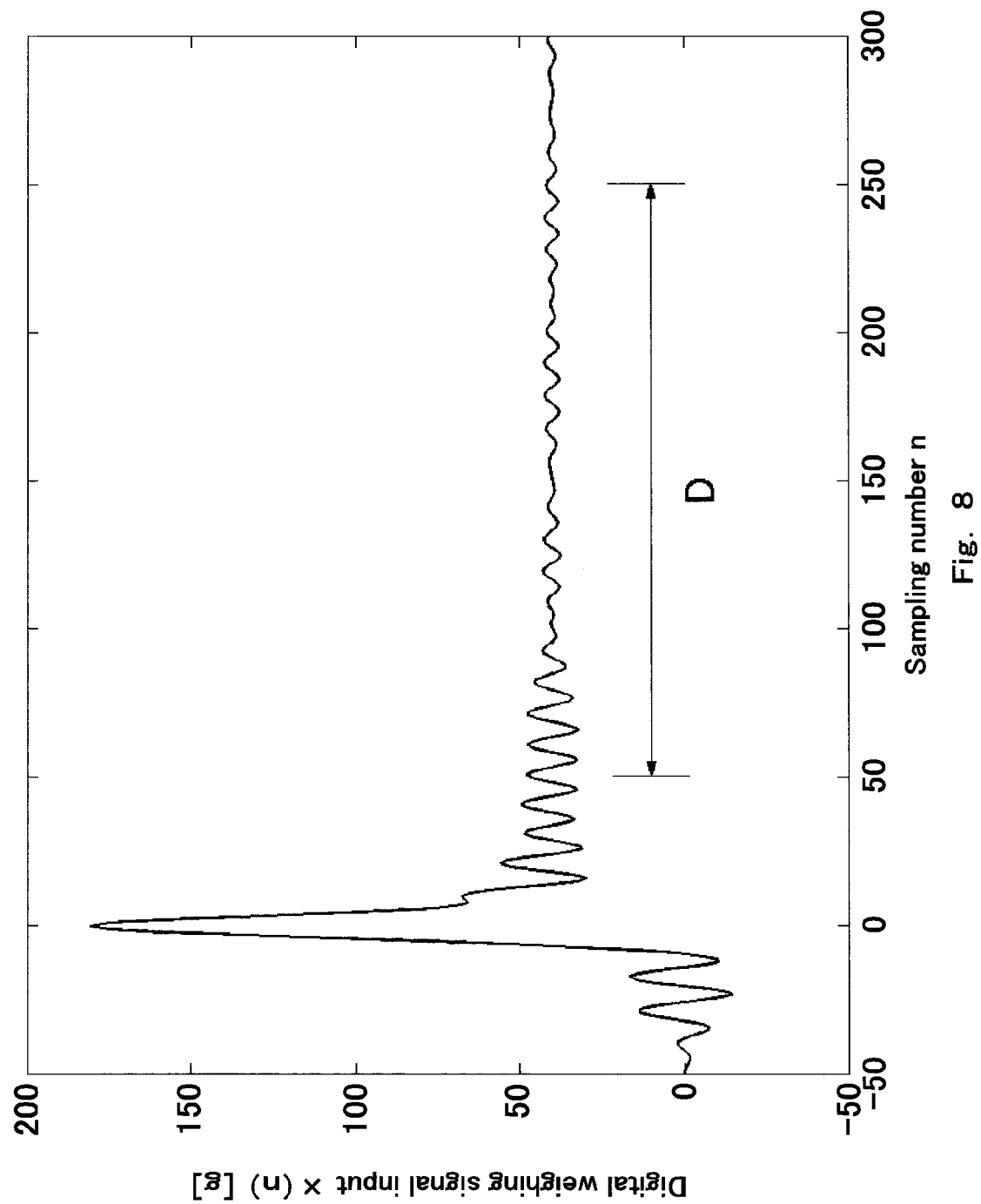
FIG. 8 is a graph showing an example of a digital weighing signal x (n) input to the digital filter for the digital weigher of the embodiment.
Figure 9:
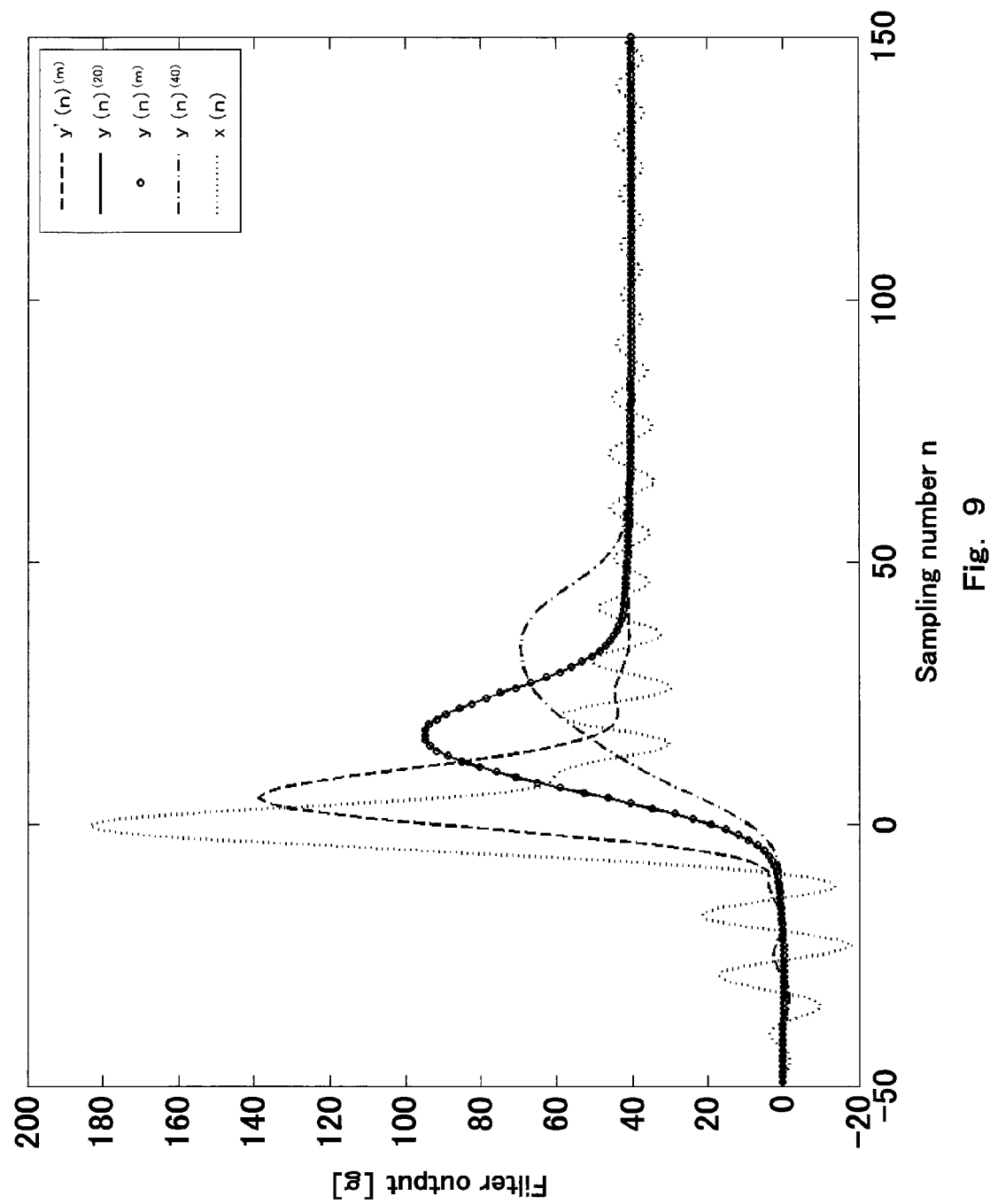
FIG. 9 is a graph showing an example of a digital weighing signal y $(n)^{(m)}$ derived by performing the wave filtering process with respect to the digital weighing signal x (n) of FIG. 8.
Figure 10:
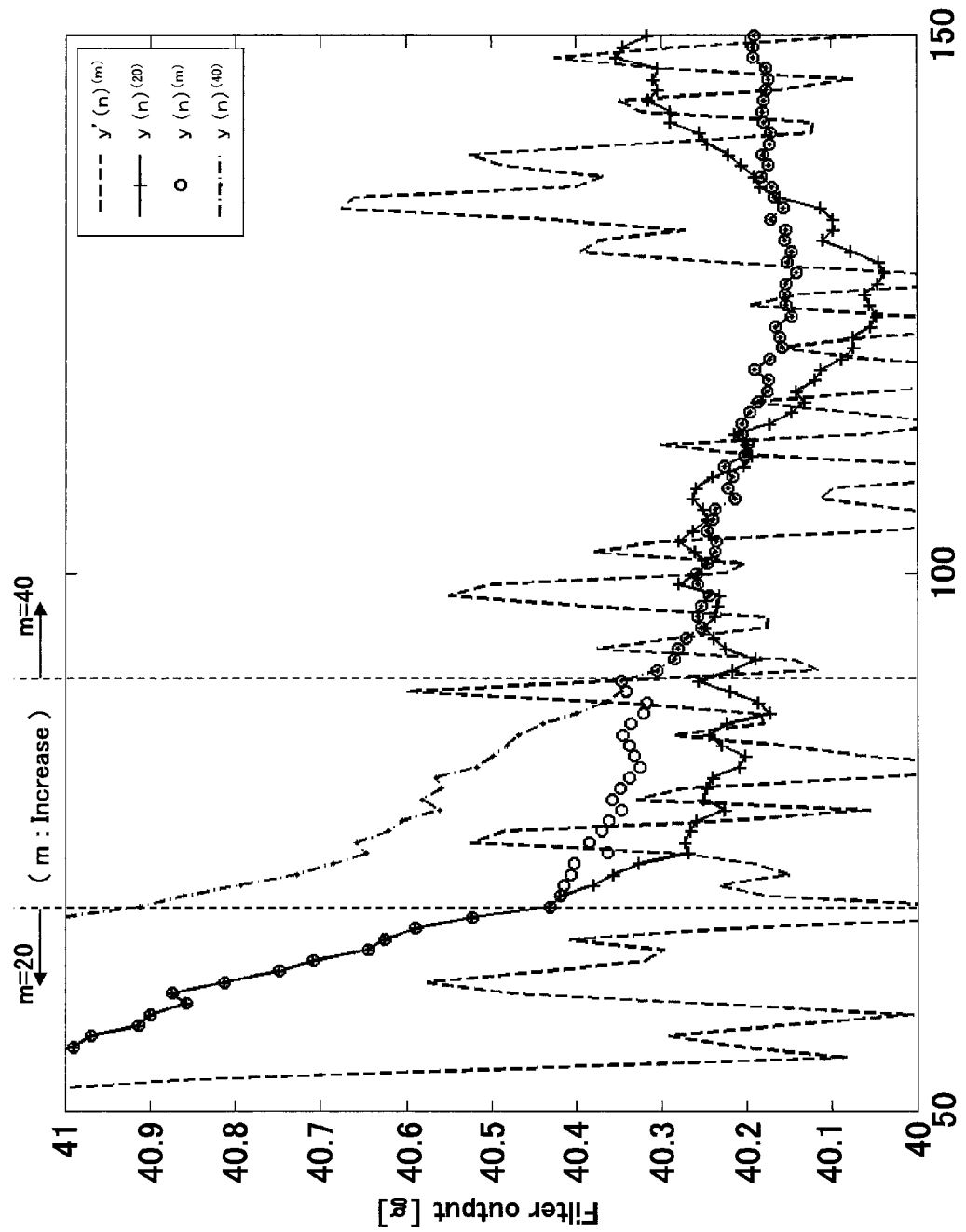
FIG. 10 is an enlarged view of the graph of FIG. 9.

Now, a description will be given of an example of the digital weighing signal derived by performing the wave filtering process by using the digital filter for the digital weigher of the present embodiment. Firstly, a description will be given of advantages provided by the wave filtering process in the case where the filter order m of the adaptive section 312 is changed. FIG. 8 is a graph showing an example of a digital weighing signal x (n) input to the digital filter for the digital weigher of the present embodiment. FIG. 9 is a graph showing an example of the digital weighing signal y $(n)^{(m)}$ derived by performing the wave filtering process with respect to the digital weighing signal x (n) of FIG. 8. FIG. 10 is an enlarged view of the graph of FIG. 9.

The digital weighing signal x (n) of FIG. 8 indicates a weight of objects of 40 g, and its sampling time T is 5 milliseconds. The filter order m of the fixation section 311 is 20, while the filter order m of the adaptive section 312 is such that its initial set value p=20 and its maximum value M=40. The reflection coefficient $k'_m$ is set in the fixation section 311 to remove the character (natural) frequency of the weight sensor 2 in the digital weigher 1 which weighs the objects.

The reflection coefficient $k_m$ of the adaptive section 312 is calculated from the corresponding input digital weighing signal x (n). More specifically, the digital weighing signal x (n) in a predetermined data sample time D indicating a state in which feeding of the objects to the digital weigher 1 is complete in the graph of FIG. 8 is sample data $x_s(n)$. In FIG.

8, the data sampling time D is a time period between the sampling number n=5 and the sampling number n=250.

In FIGS. 9 and 10, a dotted line indicates an input signal x (n), a broken line indicates an output signal y'(n)$^{(m)}$ of the fixation section 311, a solid line indicates an output signal y(n)$^{(20)}$ of the adaptive section 312 with the filter order m fixed to 20, a dot-dash-line indicates an output signal y(n)$^{(40)}$ of the adaptive section 312 with the filter order m fixed to 40, and circles indicate an output signal y(n)$^{(m)}$ derived by performing the wave filtering process by the adaptive section 312 while changing the filter order m in accordance with the control to which the present invention is applied.

As shown especially in FIG. 10, the output signal y(n)$^{(m)}$ derived by performing the wave filtering process in accordance with the control to which the present invention is applied is depicted as a signal derived by performing the wave filtering process by the adaptive section 312 operating as the filter with the filter order m=20 in a period before the sampling number n=70 and a signal derived by performing the wave filtering process by the adaptive section 312 operating as the filter with the filter order m=40 in a period after the sampling number n=90. In a period between the sampling number n=70 and the sampling number=90, it is indicated that the filter order m of the adaptive section 312 increases sequentially from 20 to 40. This makes it possible to suppress an increase in the calculation amount while damping in a short time a signal waveform of the output signal y(n)$^{(m)}$ derived by performing the wave filtering process.

Figure 11:
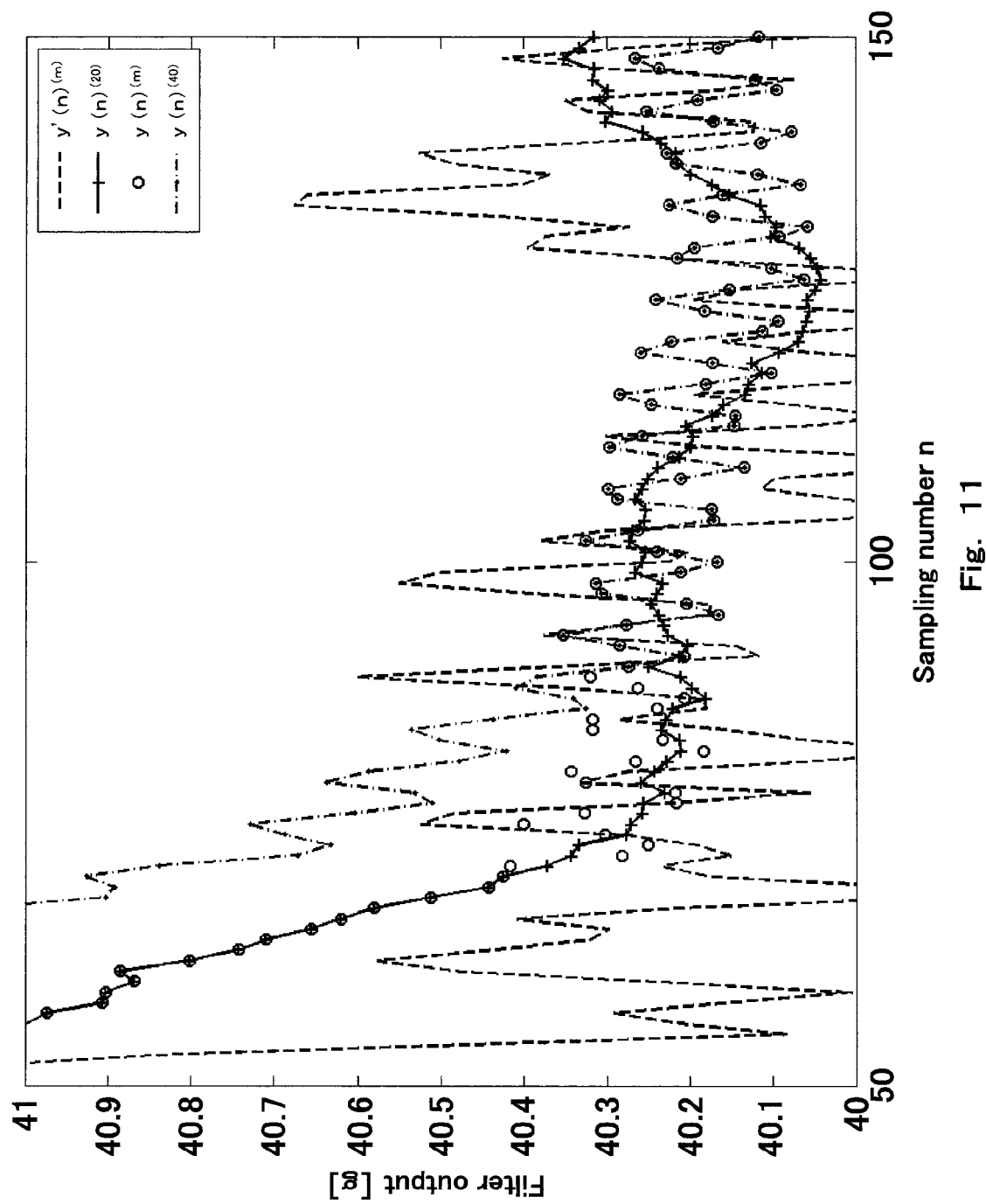
FIG. 11 is a graph showing a digital weighing signal y $(n)^{(m)}$ derived by performing the wave filtering process by the digital filter for the digital weigher of the embodiment, before changing a filter coefficient.
Figure 12:
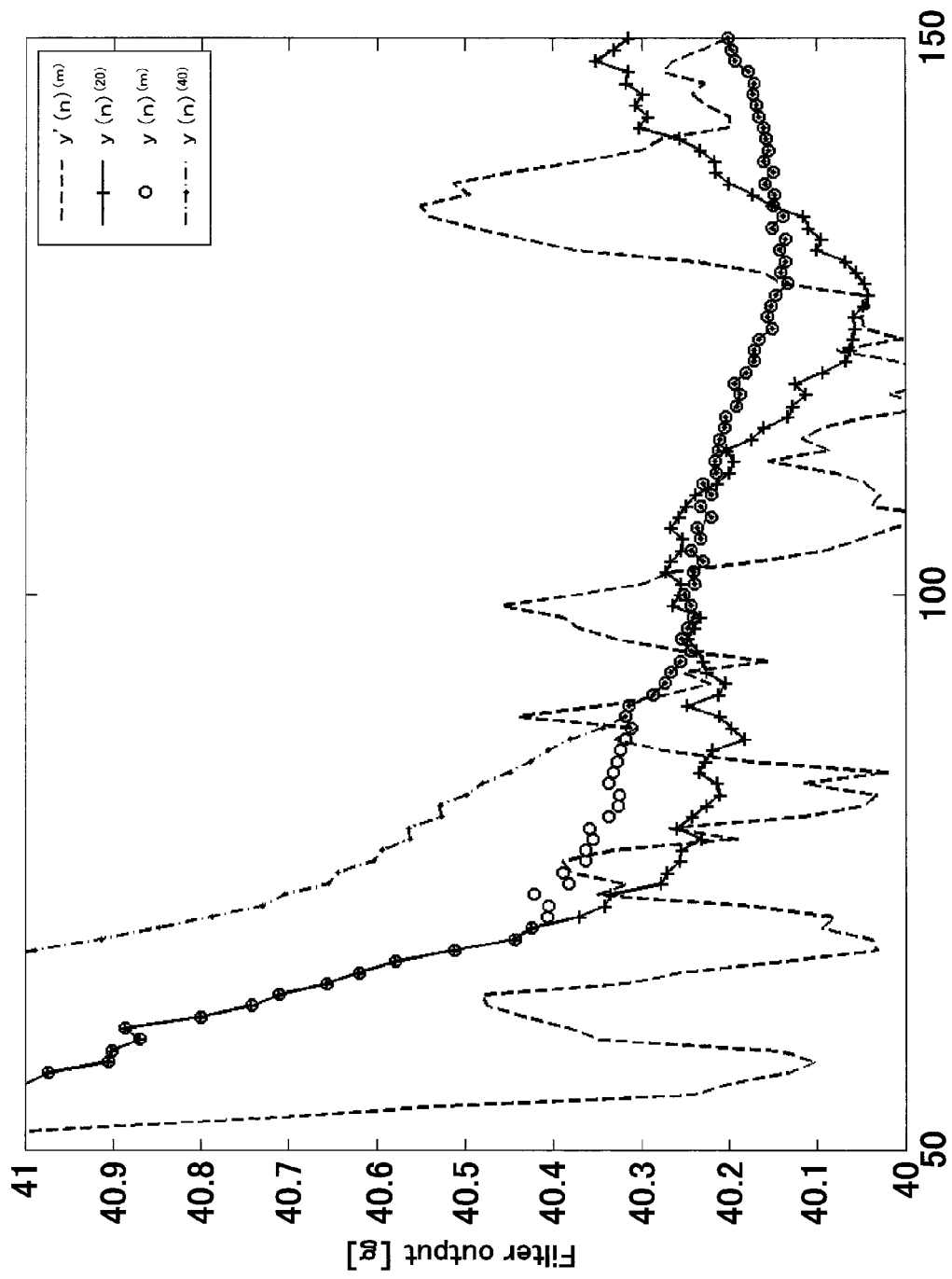
FIG. 12 is a graph showing the digital weighing signal y $(n)^{(m)}$ derived by performing the wave filtering process by the digital filter for the digital weigher of the embodiment, after changing the filter coefficient.

Then, a description will be given of advantages of the wave filtering process in the case where the filter coefficient $a_i^{(m)}$ of the adaptive section 312 is changed. FIGS. 11 and 12 are graphs showing changes in the digital weighing signal y (n)$^{(m)}$ derived by performing the wave filtering process by the digital filter for the digital weigher of the present embodiment, before and after changing the filter coefficient. FIG. 11 shows the signal before changing the filter coefficient and FIG. 12 shows the signal after changing the filter coefficient. In FIGS. 11 and 12, output signals derived from the same digital weighing signal input x (n) (not shown) are shown. A broken line indicates an output signal y'(n)$^{(m)}$ of the fixation section 311, a solid line indicates an output signal y(n)$^{(20)}$ of the adaptive section 312 with the filter order m fixed to 20, a dot-dash-line indicates an output signal y(n)$^{(40)}$ of the adaptive section 312 with the filter order m fixed to 40, and circles indicate an output signal y(n)$^{(m)}$ derived by performing the wave filtering process by the adaptive section 312 while changing the filter order m in accordance with the control to which the present invention is applied.

In the example of FIG. 11, a waveform of the output signal y(n)$^{(40)}$ of the adaptive section 312 with the filter order m=40 oscillates in a particular range even though the sampling number n increases. Therefore, as in the examples shown in FIGS. 8 to 10, even though the filter order m increases in a range between the sampling number n=70 and the sampling number n=90, the digital weighing signal y (n)$^{(m)}$ derived by performing the wave filtering process cannot fall within the predetermined allowable damping range V. For such a digital weighing signal input x (n), the frequency range of the oscillating component to be removed by the adaptive section 312 is changed by changing the filter coefficient $a_i^{(m)}$ (reflection coefficient $k_m$) of the adaptive section 312 (the above stated step SA11, SA12). Thus, for the same digital weighing signal x (n), the output signal y(n)$^{(40)}$ of the adaptive section 312 with the filter coefficient m=40, as shown in FIG. 12, can have a waveform which has damped in contrast to the waveform of the output signal y(n)$^{(40)}$ of FIG. 11. By changing the filter coefficient $a_i^{(m)}$ (reflection coefficient $k_m$) of the adaptive section 312 and thereby increasing the filter order m in the range between the sampling number n=70 and the sampling number n=90, as in the examples shown in FIGS. 8 to 10, the digital weighing signal y (n)$^{(m)}$ can be damped to fall within the allowable damping range V quickly and output.

Thus far, the embodiment of the present invention have been described. The present invention is not limited to the above described embodiment, and can be improved, changed or modified within a spirit of the invention. For example, although in the present embodiment, the lattice filter is used as the fixation section 311 as in the adaptive section 312, the present invention is not limited to this. For example, a digital filter such as a moving average filter or a notch filter can be used as the fixation section 311. A plurality of fixation sections 311 may be provided according to an oscillating component unique to the device.

Although in the present embodiment, the filter coefficient $a_i^{(m)}$ (reflection coefficient $k_m$) is not calculated during one weighing cycle, the present invention is not limited to this. For example, when the determination device 32 determines that the filter order m has reached the maximum value M or greater in one weighing cycle, the filter coefficient $a_i^{(m)}$ may be calculated and updated, and the wave filtering process may be performed again with respect to the digital weighing signal $x_j$ (n) using the updated filter coefficient $a_i^{(m)}$.

Although in the present embodiment, in the wave filtering process of the digital weighing signal, the fixation section 311 and the adaptive section 312 perform processing in series, they may perform processing in parallel. In the case where the fixation section 311 and the adaptive section 312 perform processing in series, either the fixation section 311 or the adaptive section 312 may perform processing first. Nonetheless, preferably, the adaptive section 312 may perform processing after the fixation section 311 performs processing, like the present embodiment, because the calculation amount in the adaptive section 312 can be reduced.

Although in the present embodiment, an example in which the digital filter for the digital weigher is applied to the combination weigher which is the digital weigher has been described mainly, the present invention is not limited to this. For example, the present invention is applicable to a digital weigher or the like including one weight sensor 2.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The digital filter for the digital weigher, the digital weigher including the digital filter for the digital weigher, and the wave filtering process method using the digital filter for the digital weigher, of the present invention, are useful in a digital weigher which performs control processes using a digital weighing signal containing an oscillating component having a frequency characteristic changing with time.

REFERENCE SINGS LISTS 1 digital weigher
2 weight sensor 3 controller
4 amplifier
5 display section
6 manipulation section
7 communication section
10 outside computer
30 control section (FIR filter, determination device, control device)
31 FIR filter
32 determination device
33 control device
34 memory section
35 A/D converter
36 input/output interface
310 unit filter
311 fixation section
312 adaptive section
330 reflection coefficient calculation filter

The invention claimed is:

1. A digital filter for a digital weigher, comprising:
a FIR filter configured to perform a wave filtering process with respect to a digital weighing signal to remove oscillating components from the digital weighing signal, the FIR filter including:
a fixation section configured to remove an oscillating component in a predetermined frequency range, without performing calculation for the predetermined frequency range within one weighing cycle, and
an adaptive section for removing an oscillating component in a changeable frequency range;
a determination device for determining whether or not an amplitude of an oscillating component falls within a predetermined allowable damping range, in every predetermined sampling of the digital weighing signal within the weighing cycle;
a control device configured to change the frequency range of the oscillating component in the changeable frequency range which is to be removed by the adaptive section, based on a result of the determination performed by the determination device; and
wherein both of the fixation section and the adaptive section of the digital filter sequentially perform the wave filtering process with respect to the digital weighing signal input to the digital filter.

2. The digital filter for the digital weigher according to claim 1,
wherein the control device is configured to change a filter coefficient of the adaptive section to change the frequency range of the oscillating component which is to be removed by the adaptive section.

3. The digital filter for the digital weigher according to claim 2, wherein the control device is configured to calculate the filter coefficient based on the digital weighing signal which has been subjected to the wave filtering process in the fixation section.

4. The digital filter for the digital weigher according to claim 1,
wherein the control device is configured to change a filter order of the adaptive section by a predetermined number to change the frequency range of the oscillating component which is to be removed by the adaptive section.

5. The digital filter for the digital weigher according to claim 1,
wherein the fixation section is configured to remove a character frequency of a weight sensor of a digital weigher which weights objects, from the digital weighing signal input to the FIR filter.

6. The digital filter for the digital weigher according to claim 1,
wherein the adaptive section includes lattice FIR filters of a predetermined number which are connected together.

7. The digital filter for the digital weigher according to claim 1,
wherein the fixation section includes lattice FIR filters of a predetermined number which are connected together.

8. The digital filter for the digital weigher according to claim 1,
wherein the fixation section is configured to perform the wave filtering process with respect to the digital weighing signal input to the FIR filter; and
wherein the adaptive section is configured to perform the wave filtering process with respect to the digital weighing signal derived by performing the wave filtering process by the fixation section.

9. A digital weigher comprising the digital filter for the digital weigher according to claim 1.

10. A wave filtering process method using a digital filter for a digital weigher, including a FIR filter, sequentially by configured to perform a wave filtering process with respect to a digital weighing signal to remove oscillating components from the digital weighing signal; a determination device configured to determine whether or not an amplitude of an oscillating component contained in a digital weighing signal derived by performing the wave filtering process by the FIR filter falls within a predetermined allowable damping range, in every predetermined sampling of the digital weighing signal within one weighing cycle; and a control device; wherein the FIR filter includes a fixation section configured to remove an oscillating component in a predetermined frequency range without performing calculation for the predetermined frequency range within the weighing cycle, and an adaptive section configured to remove an oscillating component in a changeable frequency range; and wherein the control device is configured to change a filter coefficient of the adaptive section, based on a result of the determination performed by the determination device, the method comprising the steps of:
calculating a filter coefficient of the fixation section based on a sine wave corresponding to a character frequency of a weight sensor of a digital weigher;
calculating a filter coefficient of a lattice filter of the adaptive section based on a predetermined integrated weighing signal;
inputting the digital weighing signal to the digital filter for the digital weigher; and
performing a wave filtering process with respect to the weighing digital signal input to the FIR filter, sequentially by the fixation section and the adaptive section, based on the filter coefficient calculated in the fixation section and the filter coefficient calculated in the adaptive section;
wherein when the determination device determines that the filter coefficient should be changed after a specified weighing cycle, the control device calculates and updates the filter coefficient of the adaptive section based on the digital weighing signal in a previous weighing cycle.

* * * * *